United States Patent [19]

Cox

[11] 3,907,906

[45] Sept. 23, 1975

[54] PROCESS OF RECOVERING ALCOHOLS AND OIL FROM WASTE MIXTURES

[75] Inventor: David S. Cox, Hanover, Md.

[73] Assignee: Continental Oil Company, Ponca City, Okla.

[22] Filed: Sept. 13, 1973

[21] Appl. No.: 397,029

Related U.S. Application Data

[63] Continuation of Ser. No. 240,319, March 29, 1972, abandoned.

[52] U.S. Cl............ 260/615 R; 260/412; 260/643 E
[51] Int. Cl.............................................. C07c 41/12
[58] Field of Search......... 260/615 R, 615 B, 643 E, 260/632 A

[56] References Cited
UNITED STATES PATENTS

| | | | |
|---|---|---|---|
| 2,451,945 | 10/1948 | Hanford | 260/632 A |
| 2,593,314 | 4/1952 | Kimberlin | 260/632 A |
| 2,983,687 | 5/1961 | Myers | 260/632 A |
| 3,150,088 | 9/1964 | Hunt et al. | 252/32.7 R |
| 3,150,089 | 9/1964 | Hunt | 252/32.7 |
| 3,277,002 | 10/1966 | Hunt et al. | 260/32.7 E |

FOREIGN PATENTS OR APPLICATIONS 942,067  11/1963  United Kingdom............ 260/615 R

*Primary Examiner*—Howard T. Mars
*Attorney, Agent, or Firm*—F. Lindsey Scott

[57] ABSTRACT

A process for recovering alcohols and oil from mixtures comprising alkaline earth metal carbides, carbide residues, alcoholates, hydroxides and oxides; alcohols; filter aids and oil by contacting the mixture with a solution of a water-soluble material selected from the group consisting of ammonium carbonate, ammonium bicarbonate, alkali metal carbonates, alkali metal bicarbonates and carbon dioxide.

4 Claims, No Drawings

PROCESS OF RECOVERING ALCOHOLS AND OIL FROM WASTE MIXTURES

This is a continuation, of application Ser. No. 240,319, filed Mar. 29, 1972 and now abandoned.

FIELD OF THE INVENTION

This invention relates to the recovery of alcohols and oil from mixtures comprising alkaline earth metal carbides, alcoholates, hydroxides and oxides; alcohols; filter aids and oil.

BRIEF DESCRIPTION OF THE PRIOR ART

In various processes for the production of alkaline earth metal alcoholates and the like for use in applications such as lubricating oil additives and the like, mixtures containing a variety of components such as alkaline earth metal carbides, carbide residues, alcoholates, hydroxides and oxides; alcohols; filter aids; oil and the like are obtained as a waste product. The disposal of such waste product mixtures presents numerous problems. In the past, such mixtures have been dumped in public dumping areas or otherwise disposed of by conventional means. The waste product is extremely combustible and the risk of fire makes such disposable undesirable. As a result much time and effort has been devoted to methods for disposing of this material in some manner such that the fire hazard is avoided and pollution minimized.

OBJECTS OF THE INVENTION

It is an object of the present invention to dispose of mixtures comprising alkaline earth metal carbides, carbide residues, alcoholates, hydroxides and oxides; alcohols; filter aids; oil and the like in a manner such that fire hazards are minimized and environmental pollution is reduced.

It is a further objective of the present invention to recover from such mixtures as useful products alcohols and oils.

A further objective of the present invention is the disposal of such mixtures in such a manner that fire hazards and pollution to the environment are reduced and useful products are simultaneously recovered.

SUMMARY OF THE INVENTION

It has now been found that the objectives of the present invention are achieved by a process for recovering alcohols containing up to about 15 carbon atoms and oil from a mixture comprising alkaline earth metal carbides, carbide residues, alcoholates, hydroxides and oxides; alcohols; filter aids; oil and the like by contacting said mixture with an effective amount of a solution of a water soluble material selected from the group consisting of ammonium carbonate, ammonium bicarbonate, alkali metal carbonates, alkali metal bicarbonates and carbon dioxide and thereafter separating the hydrophilic and hydrophobic portions.

DESCRIPTION OF THE PREFERRED EMBODIMENTS

In a process for the production of the calcium and magnesium alkoxides of the monocarbonate of the monomethyl ether of diethylene glycol hereinafter referred to as "calcium intermediate" and "magnesium intermediate", respectively, as described in U.S. Pat. No. 3,150,088 issued Sept. 22, 1966 to Hunt, U.S. Pat. No. 3,150,089 issued Sept. 22, 1964 to Hunt, and U.S. Pat. No. 3,277,002 issued Oct. 4, 1964 to Hunt, a residue results which comprises primarily alkaline earth metal carbides, carbide residues, alkaline earth metal intermediates, methyl CELLOSOLVE*; filter aids; oil and alkaline earth oxides and hydroxides. This residue cake has posed problems in that fires have resulted from in process handling as well as in the disposal areas. Further the waste is a semi-solid oily waste and constitutes a serious environmental pollutant. It has been found that upon treatment with a water solution of sodium bicarbonate the alkaline earth metal intermediate is converted to the corresponding monoether alcohol and alkaline earth metal carbonate, calcium carbide is converted to calcium carbonate and acetylene and the alkaline earth metal oxides are reduced to sodium hydroxide and alkaline earth metal carbonates. Thereafter the alcohol material may be recovered by distillation from the water layer or from the oil layer. The oil and filter aid have no part in the reaction and are recovered by simple decantation or other methods well known in the art.

*Registered trademark of Union Carbide and Carbide Corporation for 2-ethoxyethanol.

The alcohols recovered may be selected from the group consisting of alkanols containing up to about 15 carbon atoms and monoether alcohols of dihydroxy alcohols containing up to about 10 carbon atoms.

Some specific examples of such alcohols are methanol, butanol, isobutanol, isopentanol, 2-ethyl butanol, monomethyl ether of ethylene glycol, monophenyl ethers of ethylene glycol, monoethyl ether of diethylene glycol and the like. The monoether alcohols of dihydroxy alcohols recovered may be further described as having the general formula:

where R contains from about 2 to about 6 carbon atoms and R' contains from 1 to about 8 carbon atoms. Particularly preferred alcohols are the monoether alcohols of dihydroxy alcohols containing up to 10 carbon atoms. The alcohols are found in the waste mixtures as alcohols per se, alkaline earth metal alcoholates or alkaline earth metal alkoxides of the monocarbonate of the monoether alcohols of dihydroxy alcohols. The alcoholates and alkoxides are converted to the corresponding alcohol by treatment with a solution of a material selected from the group consisting of ammonium carbonate, ammonium bicarbonate, alkali metal carbonates, alkali metal bicarbonates and carbon dioxide. Water solutions of ammonium carbonates, alkali metal carbonates or bicarbonates are preferred. Some specific examples are sodium carbonate, sodium bicarbonate, potassium carbonate, potassium bicarbonate, ammonium carbonate and ammonium bicarbonate.

The alkaline earth metal monocarbonates of the monoethers of dihydric alcohols may be described as having the formula:

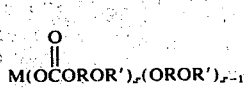

wherein M is selected from the group consisting of magnesium, calcium, strontium, and barium, $x$ is equal to the valence of M, R contains from about 2 to about 6 carbon atoms and R' is selected from the group consisting of hydrogen and alkyl groups containing from about 1 to about 8 carbon atoms.

Some specific examples of alkaline earth metal alkoxides of the monocarbonate of monoether alcohols of difunctional alcohols are: calcium alkoxide of the monomethyl ether of ethylene glycol, magnesium alkoxide of the monomethyl ether of ethylene glycol, strontium alkoxide of the monomethyl ether of ethylene glycol and the like.

The alkaline earth metal hydroxides and oxides of magnesium, calcium, strontium and barium are converted to the corresponding carbonates and are removed by conventional means.

The reactions are illustrated by, but not limited to, the following equations:

I

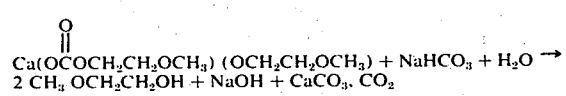

II

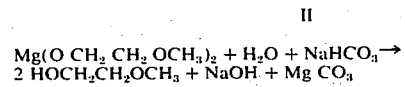

III

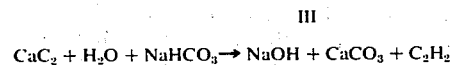

IV

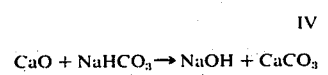

The requisite amount of ammonium carbonate, ammonium bicarbonate, alkali metal carbonate, alkali metal bicarbonate or carbon dioxide is determined primarily by the amount of reactive material in the mixture treated. The basic requirement is that enough carbonate material be added to effectively neutralize all alcoholates, alkali earth metal hydroxides, oxides and alkali earth metal carbides. It will be obvious to those skilled in the art that a slight excess of the neutralizing material will aid in speeding the reaction, obtaining complete reaction and the like.

The oil found in the mixture is an inert oil which may be used for a variety of applications, i.e. the oil may be present as a by-product of processes producing an over-based lubricating oil or the like. The oil may also be present as a flushing media for removing the residue from reaction vessels and the like. In any event the oil is an unreactive, inert oil with respect to the carbonate material. The oil may be selected from the group consisting of but not limited to paraffinic, naphthenic, and aromatic hydrocarbon oils, ethers, vegetable oils, lard oils, sperm oil, synthetic oils such as polymers of propylene, polyoxyalkalines, polyoxypropylenes and synthetic ethers such as those derived from adipic and azelic acids.

In preferred embodiments of the process the alcohols, if water insoluble, are recovered by distillation or other means known in the art from the oil layer. Water soluble alcohols may be recovered by similar methods known in the art from the aqueous portion of the reaction mixture. The oil, as noted above, may be any oil which is inert to the carbonate material. Desirable results have been obtained wherein the boiling range of the oil is greater than about 250°F. When water insoluble alcohols are to be recovered it is desirable that the boiling point of the oil differ from that of the alcohol by at least about 50°F. The reaction mixture is readily separated to a hydrophobic and hydrophilic portion by means known in the art. The method for separating the alcohols from either of such portions are well known in the art and will not be discussed further.

The insoluble alkaline earth metal carbonate produced in the reaction and the filter aid are recovered with any other inert materials present by any convenient means such as filtration and the like and are useful as a source of alkaline neutralizing material, for landfill, agricultural lime and the like.

The filter aid may be any commonly used filter aid material, such as diatomaceous earth, asbestos, and the like.

The aqueous or oil portion containing the recovered alcohols may be recycled through several recovery reactions to reach a relatively high alcohol concentration prior to recovery of the alcohols if desired. Such recycling minimizes the further processing required to recover the alcohols.

Many process variations and modifications are possible within the scope of the present invention and may appear obvious or desirable to those skilled in the art based upon the foregoing description of preferred embodiments and the appended examples and claims.

Examples

EXAMPLE I 25.4 grams of calcium intermediate filter cake, containing 8.6 grams calcium intermediate (calcium alkoxide of the monocarbonate of monomethyl ether of diethylene glycol), 1.3 grams oil, 5.6 grams filter aid, and 9.9 grams calcium carbide residue; 100 grams of water and 2.6 grams of $NaHCO_3$ were added to a reaction vessel and mixed well at room temperature for 1 hour. The mixture was allowed to settle, and the oil was decanted. A solids product stream was separated from the remaining mixture by filtration.

The solids product stream contained 9.9 grams water, 0.7 gram of the monomethyl ether of ethylene glycol, 5.6 grams filter aid, and 13.7 grams carbonated residue.

The liquid product stream contained 1.2 grams oil, 6.6 grams monomethyl ether of ethylene glycol, 1.0 gram NaOH, and 90 grams water.

It will be observed that the majority of the oil and monomethyl ether of ethylene glycol is found in the liquid stream and that the solids stream contains no components harmful to the environment and is useful as recovered as an alkaline neutralizing material, land fill meterial, and the like. The monomethyl ether of ethylene glycol is readily recovered from the liquid stream by distillation and the like or the aqueous stream may be recycled to increase the monomethyl ether of ethylene glycol content prior to recovery as shown in Example II.

EXAMPLE II

The procedure was the same as in Example I except that the charge streams were a filter cake containing 7.1 grams calcium intermediate, 5.8 grams filter aid, 2.3 grams oil, 7.4 grams calcium carbide residue, and 0.4 gram unreacted calcium carbide, and an aqueous stream containing 75.4 grams water, 4.6 grams $NaHCO_3$, and 12.0 grams monomethyl ether of ethylene glycol.

The product streams were a decant oil stream containing 2.3 grams oil, an aqueous stream containing 66.9 grams water, 16.6 grams monomethyl ether of ethylene glycol, and 2.0 grams NaOH, and a solids stream containing 5.7 grams water, 0.2 gram NaOH, 1.4 grams monomethyl ether of ethylene glycol, 5.8 grams filter aid, and 12.8 grams carbonated residue.

It is readily seen that by the use of an aqueous charge stream containing substantial amounts of monomethyl ether of ethylene glycol, the desirable results obtained in Example I are achieved and an aqueous stream containing larger amounts of monomethyl ether of ethylene glycol is available for recovery operations.

The oil used in both examples is an oil having the following properties although the invention is not limited to such oil.

| Typical Properties | |
|---|---|
| Composition, Wt. % | |
| Alkylbenzenes | 34.2 |
| Diphenylalkanes | 46.9 |
| Dialkylbenzenes | 18.9 |
| Distillation Range, °F | |
| IBP | 646 |
| 1% | 652 |
| 5% | 664 |
| 10% | 672 |
| 50% | 688 |
| 90% | 743 |
| 95% | 752 |
| FBP | cracks |
| Specific Gravity, 60°F | 0.8990 |
| Viscosity, cps | |
| 60°F | 41.9 |
| 140°F | 13.8 |
| Flash Point, COC, °F | 360 |
| Molecular Weight | 310 |
| Color, Gardner | 10 |
| Aniline Point, °F | 65.5 |
| Organic Chloride, Wt. % | 0.03 |
| Bromine Number | 0.79 |

EXAMPLE III

Further tests were performed to demonstrate the effectiveness of the present invention with materials other than calcium containing materials. 360.7 grams of a filter cake containing 20.5 grams filter aid, 10.3 grams magnesium oxide, 193.5 grams calcium intermediate, 82.5 grams calcium oxide, and 53.9 grams magnesium intermediate was mixed with 1,645.4 grams of a 13.2 weight percent $NaHCO_3$ solution. The process was carried out as described in Example I, and the recovered aqueous stream weighed 1,013.4 grams and contained 179.4 grams of monomethyl ether of ethylene glycol.

Having thus described the invention I claim:

1. A method for treating waste residue mixtures produced in processes for the production of calcium and magnesium alkoxides of the monocarbonate of the monomethyl ether of diethylene glycol, said mixtures containing compounds selected from the group consisting of:
   a. calcium and magnesium carbides;
   b. calcium and magnesium carbide residues;
   c. calcium and magnesium alcoholates wherein the alcoholic portion of said alcoholates is selected from the group consisting of alkanols containing up to about 15 carbon atoms and monomethyl ether of diethylene glycol;
   d. calcium and magnesium hydroxides and oxides;
   e. filter aid;
   f. oil wherein said oil is inert with respect to carbonate materials; and,
   g. mixtures thereof, said method consisting essentially of reacting said waste residue mixtures with an aqueous solution of a material selected from the group consisting of ammonium carbonate, ammonium bicarbonate, alkali metal carbonates, alkali metal bicarbonates and carbon dioxide said material being present in an amount at least sufficient to effectively neutralize said carbides, carbide residues, alcoholates, hydroxides and oxides in said waste residue mixtures to produce a reaction product containing calcium and magnesium carbonates, said oil, said filter aid, said alkanols, said monomethyl ether of diethylene glycol and water and recovering said alkanols and said monomethyl ether of diethylene glycol from said reaction product.

2. The method of claim 1 wherein said carbide is calcium carbide, said carbide residue is calcium carbide residue, said alcoholates are calcium alcoholates and said hydroxides and oxides are calcium hydroxides and oxides.

3. The method of claim 1 wherein said material is selected from the group consisting of alkali metal carbonates and alkali metal bicarbonates.

4. The method of claim 1 wherein said carbide is magnesium carbide, said carbide residue is magnesium carbide residue, said alcoholates are magnesium alcoholates and said hydroxides and oxides are magnesium hydroxides and oxides.

* * * * *